Jan. 12, 1965  H. M. HAWKINS  3,165,123
CONTROL OF PRESSURE DROP IN FLUID FLOW
Filed April 3, 1961

INVENTOR.
H.M. HAWKINS
BY *Hudson and Young*
ATTORNEYS 3,165,123
CONTROL OF PRESSURE DROP IN FLUID FLOW
Harold M. Hawkins, Bartlesville, Okla., assignor to Phillips Petroleum Company, a corporation of Delaware
Filed Apr. 3, 1961, Ser. No. 100,288
4 Claims. (Cl. 138—37)

This invention relates to fluids and to the control of pressure drop resulting from moving contact of a rigid surface and a fluid. In one of its aspects the invention is concerned with the pressure drop of fluids flowing through an enclosed channel and is directed to means for reducing the pressure drop of fluids flowing through a pipeline.

When a fluid moves through an enclosed channel in steady laminar flow, pressure drop is produced through resistance to flow by friction, inertia and gravity. Laminar flow is usually attained only at very low velocities. When a fluid moves through an enclosed channel in turbulent flow, additional pressure drop is produced by conversion of turbulence momentum to heat. Any method of reducing this conversion of turbulence momentum to heat will reduce the pressure drop in the moving body of fluid and will therefore reduce the amount of energy or power required to move the fluid through the enclosed channel.

It is a principal object of this invention to provide means to conserve the turbulence momentum of fluids flowing in an enclosed channel. It is also an object of the invention to provide a method for reducing the pressure drop of fluids being passed through an enclosed channel such as a pipeline. A further object of the invention is to provide a flexible lining for a pipeline which will conserve turbulence momentum thereby preventing dissipation of these turbulent forces. Other objects and advantages of the invention will be apparent to one skilled in the art upon study of this disclosure including the detailed description of the invention and the appended drawing wherein:

Figure 1:
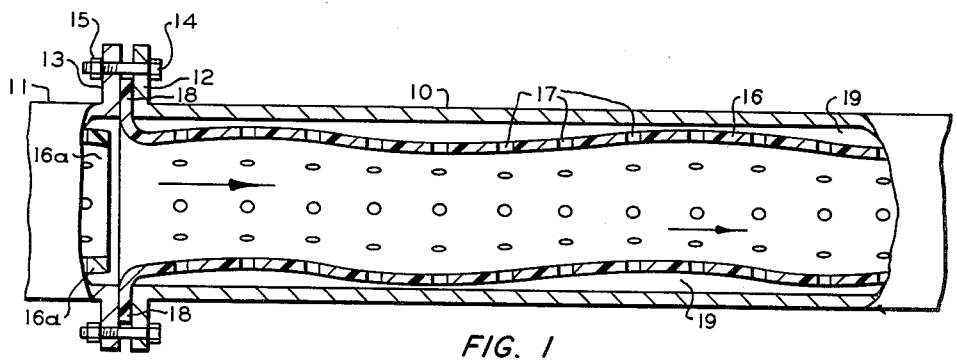
FIGURE 1 is a sectional view of an embodiment of the invention.

It is known to employ straightening vanes in conduits to suppress turbulence and to induce laminar flow for the purpose of improving the accuracy of flow meters. This method of inducing laminar flow, however, results in a considerable increase in pressure drop through the pipeline. Other methods for control of turbulence in fluids flowing through conduits such as pipelines have failed to reduce the pressure drop through the pipeline.

Broadly, the invention contemplates positioning a flexible sleeve within the conduit so that there is communication between the interior of the sleeve and the annulus between the sleeve and the conduit. This communication can be achieved by means of perforations through the sleeve or by leaving the downstream end of the sleeve free, i.e., not sealed to the conduit. If the communication is achieved by means of perforations through the sleeve, the downstream end of the sleeve can be free or sealed to the conduit as desired. If the sleeve is perforated, the tensile strength of the sleeve can be uniform throughout its length because the static pressure within the sleeve and the static pressure in the annulus will be equalized by means of the perforations. If, however, the sleeve is impermeable to the fluid in the conduit and is sealed to the conduit at the upstream end and is free at the downstream end, the tensile strength of the sleeve at the upstream end will necessarily be sufficient to withstand the difference in static pressure between that of the upstream end of the sleeve and that of the downstream end of the sleeve, i.e., the pressure drop throughout the length of the sleeve because this will represent the pressure drop across the wall of the sleeve at its upstream end. It therefore follows that the sleeve should be constructed of material which is flexible but not elastic, at least not sufficiently elastic to be distended by the pressure drop across the sleeve at the upstream end of the sleeve.

A fluid flowing in a turbulent flow regime in a conduit will have a net flow in the direction of lower pressure. This pressure drop is caused by interaction of turbulent eddies and action of turbulent eddies approaching the wall of the conduit. Such action converts the kinetic energy of the turbulence to viscous forces which terminate as heat energy within the system.

The present invention provides means of conserving the turbulence momentum of eddies as they approach the region of the conduit wall. Eddies with a net radial velocity component toward or away from the wall distort the flexible sleeve outward or inward respectively. The fluid within the annular space between the conduit wall and the flexible sleeve is thus displaced from regions of outward sleeve distortion to regions of inward sleeve distortion. The turbulent eddies move in a more or less random fashion to and from the boundary region and are generally small in dimension compared to the conduit diameter. Thus, the kinetic energy of the eddies is conserved by being transferred from one eddy to another by fluctuations in position of the flexible sleeve. The dissipation of kinetic energy to viscous energy and to heat is thus minimized.

In FIGURE 1, sections of conduits 10 and 11 are secured together by flanges 12 and 13 which are connected by bolts 14 and nuts 15. A sleeve 16 containing perforations 17 is positioned in conduit 10 and secured therein by the flange portion 18 confined between the conduit flanges 12 and 13. Fluid can flow from the interior of sleeve 16 to the annulus 19 through the perforations 17. A sleeve 16a, similar to sleeve 16, terminates at the flange connection 12–13.

Figure 2:
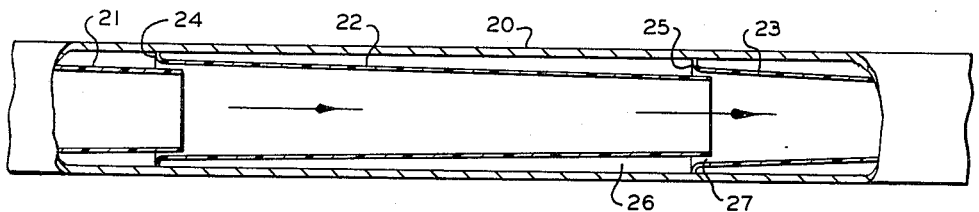
FIGURE 2 is a sectional view of a modification of the embodiment of FIGURE 1.

In FIGURE 2, conduit 20 has therein a plurality of sleeve sections 21, 22 and 23, secured to conduit 20 at their upstream ends, with respect to fluid flow as indicated by the arrows. The upstream ends of the sleeves 21, 22 and 23 can be secured to the interior of conduit 20 as indicated at 24 and 25 by cementing, riveting or other conventional means. The upstream ends of the sleeves can be secured to the conduit by flange connections as shown in FIGURE 1. Communication between the interior of the sleeve 22 and the annulus 26 is achieved by means of the free space or annulus 27 between the open ends of sleeve 22 and sleeve 23.

In the operation of the means of the invention the energy of the turbulence momentum generated in the body of flowing fluid is absorbed by the fluid in the annulus through the flexible sleeve and is transmitted back to the flowing fluid through the flexible sleeve. The reduction in pressure drop which results from the device of my invention appears to be obtained by causing the turbulence energy generated in a flowing fluid to do work instead of being dissipated into heat.

Although I have attempted to explain the theory of operation of the means of my invention for reducing pressure drop of fluids flowing through confined channels, I do not intend that the invention shall be limited to the theory set forth. It will be appreciated by those skilled in the art that variations and modifications are possible without departing from the spirit and scope of the invention.

The invention can be utilized in conduits having a cross-sectional configuration other than circular as well as in circular pipes. Thus rectangular or oval conduits are applicable. The space between the conduit wall and lining wall will, in any event, be considered as annulus.

That which is claimed is:

1. A conduit for conveying a fluid which consists essentially of a substantially rigid conduit shell; and a flexible lining for said shell composed of a plurality of flexible sleeve members, each having an outside diameter less than the inside diameter of the shell so as to provide an annular space between the sleeve and the shell, serially secured to said shell at the upstream open end of each sleeve with respect to the direction of flow of fluid so that the downstream open end of each sleeve terminates approximately at the upstream end of the succeeding sleeve throughout the conduit; and means for fluid communication between the interior and the exterior of the sleeves.

2. A conduit according to claim 1 wherein the sleeves are perforated so that fluid communication between the interior of the liner and the rigid conduit shell is provided by the perforations.

3. A conduit according to claim 1 wherein the sleeves are imperforate and the downstream open end of each sleeve is free and terminates within and adjacent the upstream open end of the succeeding sleeve so as to provide fluid communication between the interior of the sleeve and the annular space between the sleeve and conduit.

4. In a rigid conduit for conveying fluids, the combination therewith of a flexible conduit lining for conserving turbulence momentum induced in a fluid flowing through said conduit consisting essentially of a plurality of impermeable, flexible sleeves secured to the inside of said conduit at the upstream end of each sleeve, with respect to the direction of fluid flow, so that the free end of each sleeve terminates within and adjacent the secured end of the succeeding sleeve throughout the length of the conduit to provide an annular space between the sleeves for fluid communication between the interior and exterior of the sleeves.

References Cited in the file of this patent
UNITED STATES PATENTS

| | | |
|---|---|---|
| 1,948,909 | Evans | Feb. 27, 1934 |
| 2,150,768 | Hedrick | Mar. 14, 1939 |
| 2,478,326 | Scarth | Aug. 9, 1949 |
| 2,690,806 | Britton et al. | Oct. 5, 1954 |
| 2,877,860 | Hoffar | Mar. 17, 1959 |
| 2,982,311 | Haskell | May 2, 1961 |
| 3,099,993 | Smith | Aug. 6, 1963 |